United States Patent [19]
Yoshida

[11] Patent Number: 5,398,116
[45] Date of Patent: Mar. 14, 1995

[54] IMAGE COMMUNICATION APPARATUS
[75] Inventor: Takehiro Yoshida, Tokyo, Japan
[73] Assignee: Canon Kabushiki Kaisha, Tokyo, Japan
[21] Appl. No.: 270,418
[22] Filed: Jul. 5, 1994

Related U.S. Application Data

[63] Continuation of Ser. No. 889,993, May 29, 1992, abandoned.

[30] Foreign Application Priority Data

Jun. 4, 1991 [JP] Japan ................................ 3-132696

[51] Int. Cl.$^6$ ............................................. H04N 1/32
[52] U.S. Cl. ................... 358/450; 358/440; 358/447
[58] Field of Search ............... 358/434, 443, 257, 296, 358/256, 280, 440, 408, 435, 450; 375/8, 39

[56] References Cited

U.S. PATENT DOCUMENTS

| | | | |
|---|---|---|---|
| 4,785,355 | 11/1988 | Matsumoto | 358/257 |
| 4,811,111 | 3/1989 | Kurokawa | 358/257 |
| 4,823,193 | 4/1989 | Takahashi | 358/257 |
| 4,843,479 | 6/1989 | Yoshiro et al. | 358/257 |
| 4,849,816 | 7/1989 | Yoshida | 358/434 |
| 4,870,503 | 9/1989 | Miura | 358/256 |
| 4,941,170 | 7/1990 | Herbst | 358/402 |
| 4,965,678 | 10/1990 | Yamada | 358/452 |
| 5,001,572 | 3/1991 | Hashimoto et al. | 358/440 |
| 5,022,072 | 6/1991 | Sakaibara et al. | 358/435 X |
| 5,231,515 | 7/1993 | Endo | 358/447 |

Primary Examiner—Paul Ip
Attorney, Agent, or Firm—Fitzpatrick, Cella Harper & Scinto

[57] ABSTRACT

An image communication apparatus adapted to transmit image information with additional information appended thereto, includes a sender data position selection button for designating a position to which the additional information is to be appended, and a transmitter for transmitting the image information with the additional information appended to a leading portion or side of the image information in accordance with a designation by said sender data position selection button.

24 Claims, 3 Drawing Sheets

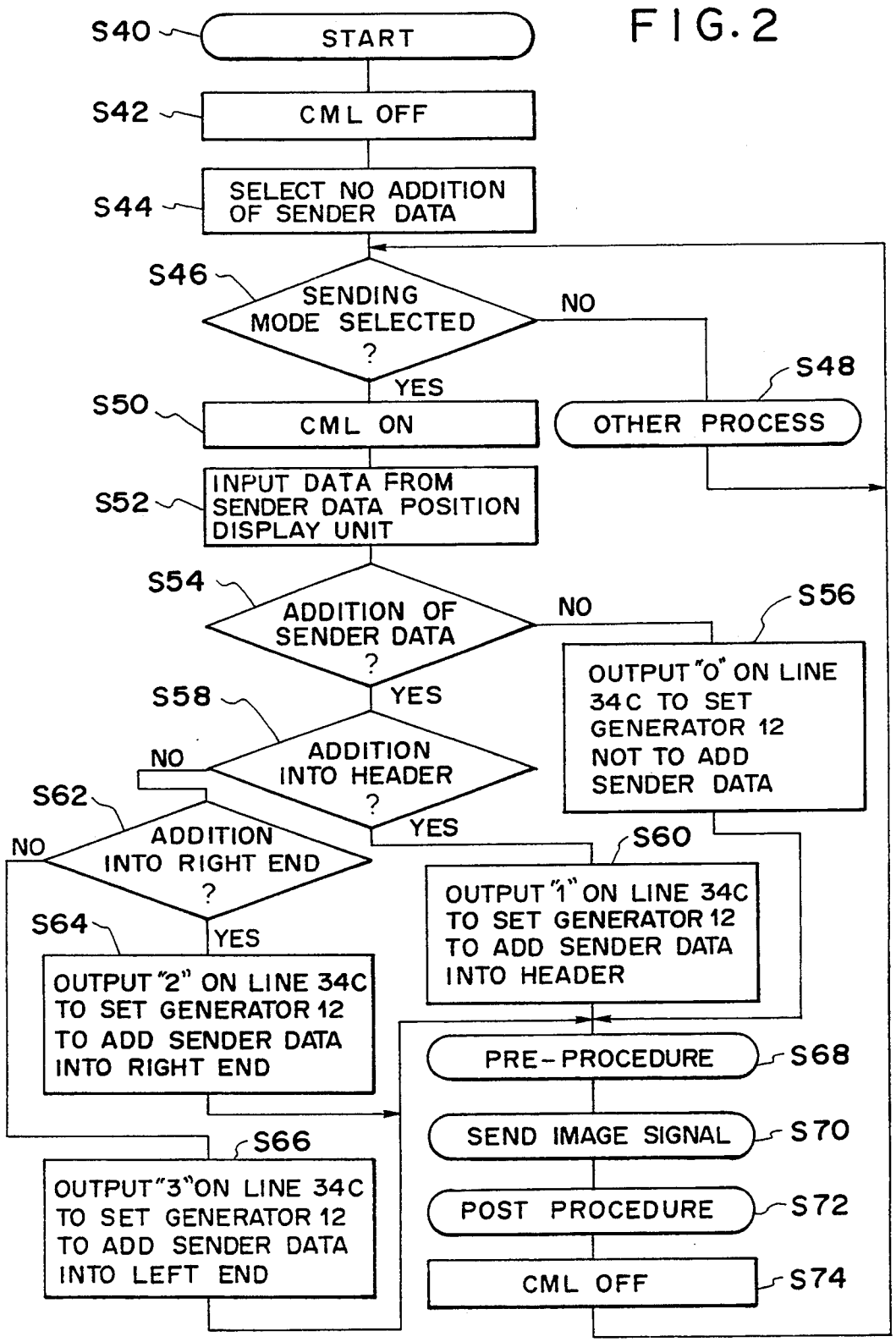

SEND SHEET ROTATED RIGHT

SEND DIRECTLY

SEND SHEET ROTATED LEFT ves showing original information and an example of original information with sending party information.

IMAGE COMMUNICATION APPARATUS

This application is a continuation of application Ser. No. 07/889,993, filed May 29, 1992, now abandoned.

BACKGROUND OF THE INVENTION

1. Field of the Invention

The present invention relates to an image communication apparatus, and more particularly to an apparatus which transmits image data with additional information appended thereto.

2. Related Background Art

Hitherto, as an image communication apparatus of this type, there has been known, for example, a facsimile apparatus. The conventional facsimile apparatus transmits read image information with sending party information such as a telephone number and an abbreviated name of a sending party, and an originating time. The sending party information is appended to a leading portion of the reading image information. However, the conventional facsimile apparatus has such a disadvantage that for instance, if an A5 size of sheet original as shown in FIG. 3(a) is rotated for 90° and then data transmission is carried out, the sending party information is appended as illustrated in FIG. 3(b). Essentially, it is preferable that the sending party information is appended, as illustrated in FIG. 3 (c), to the right end of the sheet original.

For example, as to an A4 size of sheet original shown in FIG. 3 (d), if data transmission is carried out without any rotation of the sheet original, then the sending party information will be added, as shown in FIG. 3(e), to the preferable location.

As patents concerning addition of the sending party information, there are U.S. Pat. Nos. 4,870,503 4,843,479 and 4,849,816. However, there has not been proposed any invention capable of solving the foregoing problem.

SUMMARY OF THE INVENTION

An object of the present invention is to improve an image communication apparatus to resolve the foregoing drawbacks.

A further object of the present invention is to provide an image communication apparatus in which appending of additional information is performed in alignment with a direction of image information to be transmitted.

The other objects of the present invention will become more apparent from the consideration of the following detailed description taken in conjunction with the accompanying drawings.

BRIEF DESCRIPTION OF THE DRAWINGS

FIG. 2 is a flow chart showing a control operation of a control circuit 34 in FIG. 1;

DESCRIPTION OF THE PREFERRED EMBODIMENTS

The present invention will be explained in detail referring to illustrative embodiments shown in the accompanying drawings.

Figure 1:
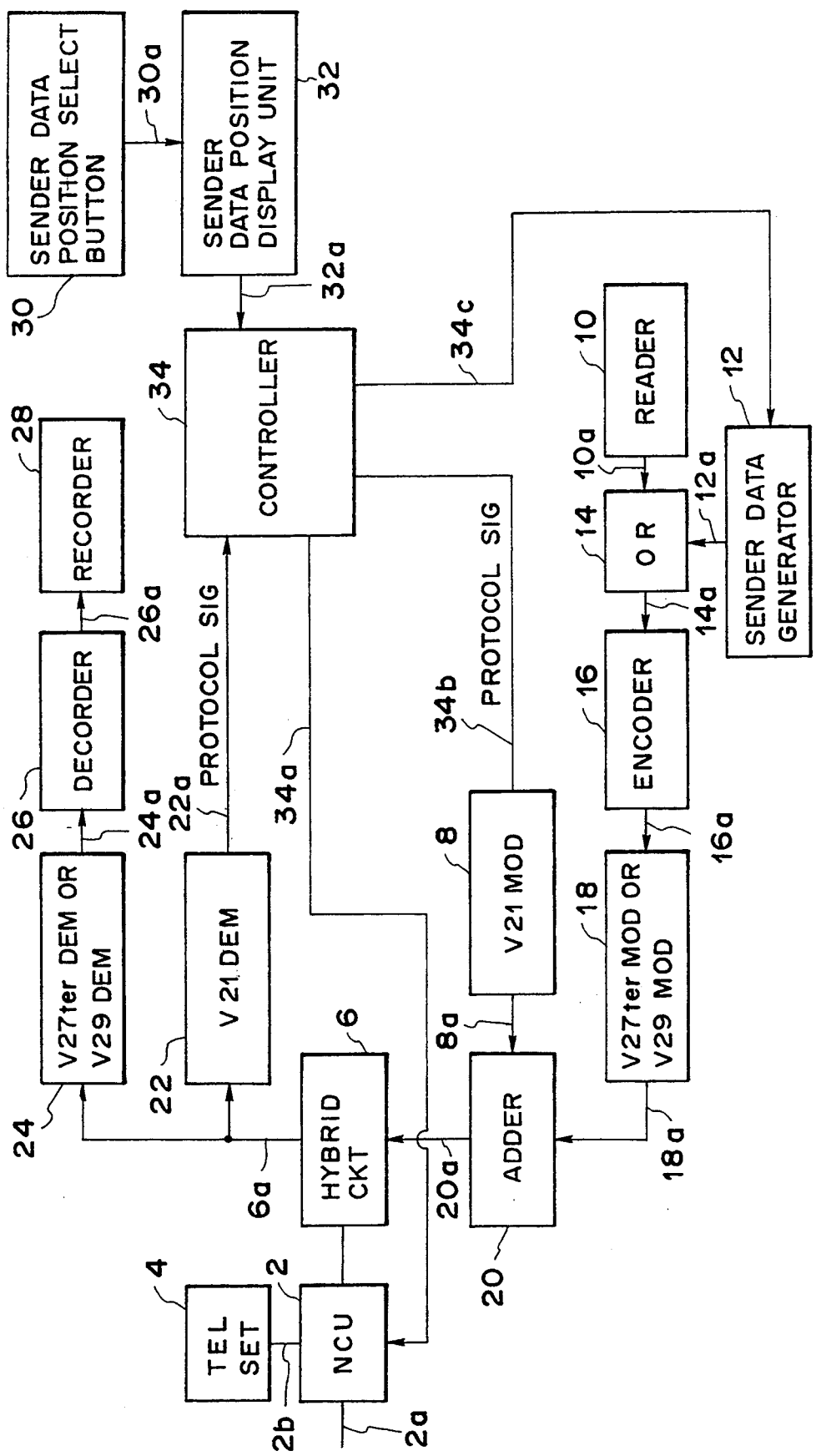
FIG. 1 is a block diagram showing a structure of a facsimile apparatus according to an embodiment of the present invention.
Figure 3A:
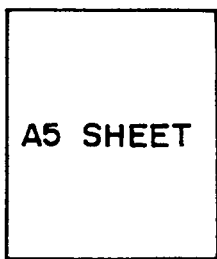
FIG. 3(a)–3(e) are views showing original information and an example of original information with sending party information.
Figure 3B:
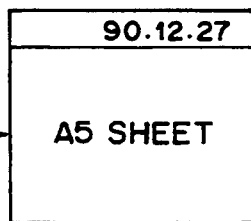
Figure 3C:
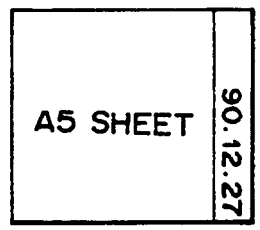
Figure 3D:
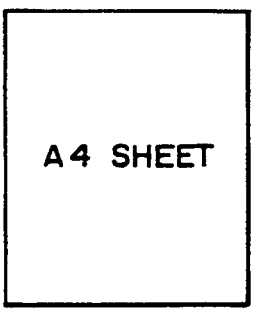
Figure 3E:
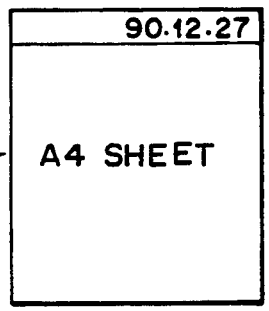

FIG. 1 is a block diagram showing a structure of a facsimile apparatus according to an embodiment of the present invention.

In the figure, an NCU (Network Control Unit) 2 is connected to a terminal of a telephone network to use the network for data communication, etc. The NCU 2 performs a connection control for a telephone exchange network, switches to a data communication line, and holds a loop. A signal line 2a is a telephone line. When the NCU 2 enters a signal on a line 34a and the signal is at level "0", the NCU connects the telephone line to the telephone set end, that is, the signal line 2a to a signal line 2b. When the NCU enters a signal on the line 34a and the signal is at level "1", the NCU connects the telephone line to a facsimile apparatus side, that is, the signal line 2a to a signal line 2c. In a usual state, the telephone line is connected to the telephone set 4. These connections of the telephone line are performed by a CML relay which is provided in NCU 2.

A hybrid circuit 6 separates a signal to be sent and a received signal in such a manner that the signal to be sent on the signal line 20a is output through the signal line 2c and the NCU 2 to the telephone line and the received signal is output through the NCU 2 and the signal line 2c to a signal line 6a.

A modulator 8 receives a protocol signal on a signal line 34b, performs a modulation based on CCITT Recommendation V 21 and outputs a modulated data to a signal line 8a.

A line of image signals in a main scanning direction are sequentially read from an original sheet by a reading circuit 10 comprising an image pickup device such as a charge coupled device (CCD), and an optical system, so that a binary stream signal representative of white and black is produced. The binary stream signal is delivered to a signal line 10a.

A sending party information generator circuit 12 outputs to a signal line 12a sending party information to be appended to a leading portion of original sheet information if a signal "1" appears on a signal line 34c, sending party information to be appended to the right end of the original sheet information if a signal "2" appears on the signal line 34c, and sending party information to be appended to the left end of the original sheet information if a signal "3" appears on the signal line 34c, respectively. If a signal "0" appears on the signal line 34c, no sending party information is outputted.

An OR circuit 14 is for taking a logical OR of a signal appearing on the signal line 10a and a signal appearing on the signal line 12a. An output of the OR circuit 14 is delivered to a signal line 14a.

An encoder 16 encodes read data appearing on the signal line 14a in accordance with for example a modified Huffman (MH) encoding scheme or a modified READ (MR) encoding scheme, and delivers the thus encoded data to a signal line 16a.

A modulator 18 performs a modulation based on CCITT Recommendation V 27 ter (differential phase modulation) or V 29 (orthogonal modulation). The modulator 18 modulates a signal on the signal line 16a and delivers the modulated data to a signal line 18a.

An adder 20 addes signals on the signal lines 8a and 18a, and delivers the added result to a signal line 20a.

A modulator 22 performs a demodulation based on CCITT Recommendation V 21. The demodulator 22 demodulates a signal on the signal line 6a and delivers the demodulated data to a signal line 22a.

A demodulator 24 performs a demodulation based on CCITT Recommendation V 27 ter (differential phase demodulation) or V 29 (orthogonal demodulation). The demodulator 24 demodulates a signal on the signal line 6a and delivers the demodulated data to a signal line 24a.

An encoder 26 decodes a signal appearing on the signal line 24a in accordance with for example a modified Huffman (MH) decoding scheme or a modified READ (MR) decoding scheme, and delivers the thus decoded data to a signal line 26a.

A recorder 28 receives the decoded data outputted on the line 26a and records sequentially white and black signals in units of a line.

A sender data position select button 30 is for designating as to whether or not sender party information is added to original sheet information to be transmitted or copied, and if added, designating as to whether the sender party information is appended at the leading portion of the original sheet information, at the right end of the original sheet information, or at the left end of the original sheet information. A pulse is generated on a signal line 30a whenever the sender data position select button 30 is depressed.

A sender data position display unit 32 is for indicating or displaying as to whether or not sender party information is added to original sheet information to be transmitted or copied, and if added, displaying as to where the sender party information is appended in the original sheet information. When a power supply is turned on, the sender data position display unit 32 indicates that the sender party information is not appended, and thereafter indicates, every time that the pulse is generated on the signal line 30a, that the sender party information is appended at the leading portion of the original sheet information, at the right end of the original sheet information, and at the left end of the original sheet information, in the order named. In addition, when the further pulse is generated on the signal line 30a, the sender data position display unit 32 indicates that the sender party information is not appended. Thereafter, this is repeated. When the sender party information is not appended, a signal "0" is outputted on the signal line 32a, and when the sender party information is appended at the leading portion of the original sheet information, at the right end of the original sheet information, and at the left end of the original sheet information, signals "1", "2" and "3" are outputted on the signal line 32a, respectively.

A control circuit 34 is constructed of a microcomputer and peripheral devices such as a ROM, a RAM and the like, and is for mainly performing a control set forth below.

When a copy or a transmission is selected, the control circuit 34 receives information outputted on the signal line 32a, and recognizes as to whether or not sender party information is added to original sheet information to be transmitted or copied, and if added, recognizes as to where the sender party information is appended in the original sheet information. The control circuit 34 sends the thus recognized information to the sending party information generator circuit 12 so as to perform a designation as to whether or not the sender party information is added to the original sheet information, and if added, a designation as to where the sender party information is appended in the original sheet information.

FIG. 2 is a flow chart showing a control operation of the control circuit 34 in FIG. 1.

Operation of the present embodiment will be explained in detail referring to FIG. 2 hereinafter.

In the figure, step S40 represents a start.

At step S42, a signal of level "0" is outputted on the signal line 34a to turn off the CML relay, so that the telephone line is connected to the telephone set side.

At step S44, the signal "0" is outputted on the signal line 34c to set the mode that a sender party information is not appended.

At step S46, it is determined as to the transmission is selected or not. If the transmission is selected, a flow (or program) proceeds to step S50. On the other hand, if the transmission is not selected, the program proceeds to step S48 to perform other process.

If the transmission is selected and then the program proceeds to step S50, a signal of level "1" is outputted on the signal line 34a to turn on the CML relay, so that the telephone line is switched to the facsimile apparatus side.

At step S52, information of the sender data position display unit 32 is entered via the signal line 32a. If it is desired in transmission that the sending party information is appended, an operator designates, with the sender data position select button 30, as to where the sending party information is appended in the read image information.

At step S54, it is determined whether or not the sending party information is appended in accordance with a result of step S52. If the sending party information is not appended, the program proceeds to step S56. On the other hand, if it is appended, the program proceeds to step S58.

When the program proceeds from step S54 to step S56, the signal "0" is outputted on the signal line 34c, so that there is set the mode that the sending party information is not appended, and then the program proceeds to step S68.

When the program proceeds from step S54 to step S58, it is determined whether or not the sending party information is appended at the leading portion in accordance with a result of step S52. If the sending party information is appended at the leading portion, the program proceeds to step S60. On the other hand, if it is not appended at the leading portion, the program proceeds to step S62.

At the step S60, the signal "1" is outputted on the signal line 34c, so that there is set the mode that the sending party information is appended at the leading portion, and then the program proceeds to step S68.

At step S62, it is determined whether or not the sending party information is appended at the right end in accordance with a result of step S52. If the sending party information is appended at the right end, the program proceeds to step S64. On the other hand, if it is not appended at the right end, in other words, if it is appended at the left end, the program proceeds to step S66.

At the step S64, the signal "2" is outputted on the signal line 34c, so that there is set the mode that the sending party information is appended at the right end, and then the program proceeds to step S68.

At the step S66, the signal "3" is outputted on the signal line 34c, so that there is set the mode that the sending party information is appended at the left end, and then the program proceeds to step S68.

At the step S68, a pre-procedure of a facsimile communication procedure is implemented so as to set a communication mode.

At step S70, a transmission of image signals is carried out in the set communication mode. There is taken a logical OR of the sending party information and the image information, and the sending party information is included in the image information.

Thus, when the transmission of the image signals is terminated, a post-procedure of the facsimile communication procedure is implemented.

At step S74, the signal "0" is outputted on the signal line 34c, and the CML relay is turned off so that the telephone line is switched to the telephone set side.

According to the above-mentioned processing, for instance, in a case where an A5 size of original sheet is rotated by 90° and read with an A4 width, it is possible to append the sending party information at the left or right side of the read image.

Figure 4F:
FIG. 4(f) and 4(g) are views showing original information and an example of original information with sending party information.
Figure 4G:
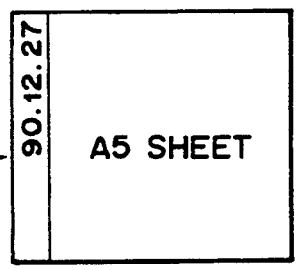

FIG. 4(f) and 4(g) show an example in which when an A5 size of original sheet (f) is rotated by 90° and transmitted, the sending party information is appended at the left side of the read image.

According to the above embodiment, the sending party information is synthesized with the original image. However, it may be so modified that when appended to the leading portion, the sending party information is appened at an outside of the original information, and when appended to the other portions, the sending party information is synthesized with the original information.

The present invention is not intended to be limited to the above-described embodiment, but various application and alterations are possible within the scope of the appended claims.

What is claimed is:

1. An image communication apparatus adapted to transmit image information with additional information appended thereto, comprising:
   means for designating a position to which the additional information is to be appended; and
   means for transmitting the image information with the additional information appended to a leading portion or a side of the image information in accordance with a designation by said designating means,
   wherein, when an original image of a first standard size having a length is to be transmitted as image information in a format of a second standard size having a width greater than the length of the first standard size, said transmitting means transmits the image information in a rotated orientation as rotated image information, with the additional information being appended to a side of the rotated image information so that a size of the rotated image information with the additional information appended thereto does not exceed the second standard size.

2. An apparatus according to claim 1, wherein the additional information is appended to a left side or a right side of the image information.

3. An apparatus according to claim 1, wherein when the additional information is appended to a side of the image information, the additional information is synthesized with the image information.

4. An apparatus according to claim 1, wherein the additional information is appended in accordance with a direction of the image information.

5. An apparatus according to claim 1, further comprising means for generating the rotated image information by rotating the original image of the first standard size by 90°, where a width of the rotated image information with the additional information appended thereto does not exceed the width of the second standard size.

6. A method of image communication adapted to transmit image information with additional information appended thereto, comprising the steps of:
   designating a position to which the additional information is to be appended; and
   transmitting the image information with the additional information appended to a leading portion or side of the image information in accordance with said designation,
   wherein, when an original image of a first standard size having a length is to be transmitted as image information in a format of a second standard size having a width greater than the length of the first standard size, the image information is transmitted in a rotated orientation as rotated image information, with the additional information being appended to a side of the rotated image information so that a size of the rotated image information with the additional information appended thereto does not exceed the second standard size.

7. A method according to claim 6, wherein when the additional information is appended to the side of the image information, the additional information is synthesized with the image information.

8. A method according to claim 6, wherein the additional information is appended in accordance with a direction of the image information.

9. A method according to claim 6, wherein the additional information is appended to a left side or a right side of the image information.

10. A method according to claim 6, further comprising a step of generating the rotated image information by rotating the original image of the first standard size by 90°, where a width of the rotated image information with the additional information appended thereto does not exceed the width of the size standard size.

11. An image communication apparatus for transmitting image information with additional information appended thereto, comprising:
   means for designating a position to which the additional information is to be appended;
   means for selecting whether the additional information is to be appended to a leeding portion of the image information or to a side of the image information, in accordance with a designation by said designating means; and
   means for transmitting the image information with the additional information appended to the leading portion or the side of the image information in accordance with a selection by said selecting means.

12. An apparatus according to claim 11, wherein the additional information is appended to a left side or a right side of the image information.

13. An apparatus according to claim 11, wherein when the additional information is appended to a side of the image information, the additional information is synthesized with the image information.

14. An apparatus according to claim 11, wherein the additional information is appended in accordance with a direction of the image information.

15. An apparatus according to claim 11, further comprising means for generating rotated image information by rotating the original image by 90°, where the additional information is appended to the rotated image information and a width of the rotated image information with the additional information appended thereto does not exceed a regular size.

16. An apparatus according to claim 11, wherein said image communication apparatus is a facsimile apparatus.

17. An apparatus according to claim 11, wherein said designating means designates the position to which the additional information is to be appended in accordance with an input manually entered by an operator.

18. A method of image communication for transmitting image information with additional information appended thereto, comprising the steps of:

designating a position to which the additional information is to be appended;

selecting whether the additional information is to be appended to a leading portion of the image information or to a side of the image information in the designating step; and transmitting the image information with the additional information appended to the leading portion or the side of the image information in accordance with a designation in said designating step.

19. A method according to claim 18, wherein when the additional information is appended to the side of the image information, the additional information is synthesized with the image information.

20. A method according to claim 18, wherein the additional information is appended in accordance with a direction of the image information.

21. A method according to claim 18, wherein the additional information is appended to a left side or a right side of the image information.

22. A method according to claim 18, further comprising a step of generating rotated image information by rotating the original image by 90°, where the additional information is appended to the rotated image information and a width of the rotated image information with the additional information appended thereto does not exceed a regular size.

23. A method according to claim 18, wherein said image communication method is a communication method for a facsimile apparatus.

24. A method according to claim 18, wherein in the designating step, the position to which the additional information is to be appended is designated in accordance with an input manually entered by an operator.

* * * * *

UNITED STATES PATENT AND TRADEMARK OFFICE
CERTIFICATE OF CORRECTION

PATENT NO. : 5,398,116
DATED : March 14, 1995
INVENTOR(S) : TAKEHIRO YOSHIDA

It is certified that error appears in the above-identified patent and that said Letters Patent is hereby corrected as shown below:

<u>IN THE DRAWINGS</u>

Sheet 1 of 3, "DECORDER" should read --DECODER--.

<u>COLUMN 6</u>

Line 47, "size" (first occurrence) should be deleted.
Line 54, "leeding" should read --leading--.

Signed and Sealed this

Twentieth Day of June, 1995

Attest:

BRUCE LEHMAN

Attesting Officer    Commissioner of Patents and Trademarks